US011709617B2

(12) United States Patent
Liang et al.

(10) Patent No.: US 11,709,617 B2
(45) Date of Patent: Jul. 25, 2023

(54) MULTI-STAGE MEMORY DEVICE PERFORMANCE NOTIFICATION

(71) Applicant: Micron Technology, Inc., Boise, ID (US)

(72) Inventors: Qing Liang, Boise, ID (US); Mingke Yu, Eagle, ID (US); Deping He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 20 days.

(21) Appl. No.: 16/997,055

(22) Filed: Aug. 19, 2020

(65) Prior Publication Data

US 2022/0057956 A1 Feb. 24, 2022

(51) Int. Cl.
*G06F 3/06* (2006.01)
(52) U.S. Cl.
CPC .......... *G06F 3/0653* (2013.01); *G06F 3/0604* (2013.01); *G06F 3/0659* (2013.01); *G06F 3/0673* (2013.01)
(58) Field of Classification Search
CPC .... G06F 3/0653; G06F 3/0604; G06F 3/0659; G06F 3/0673; G06F 12/0238; G06F 13/1694; G06F 2212/1016; G06F 2212/7205; G06F 2212/7206; G06F 2212/7208; G06F 12/0284
See application file for complete search history.

(56) References Cited

U.S. PATENT DOCUMENTS 8,650,376 B2  2/2014 Eldredge et al.
8,812,775 B2  8/2014 Kim
2010/0268874 A1  10/2010 Pyeon
2012/0047320 A1* 2/2012 Yoo ............... G06F 3/0679 711/E12.008
2015/0331609 A1* 11/2015 Jedema ............ G07F 7/082 711/104
2016/0092325 A1* 3/2016 Bar .............. G06F 11/0766 714/6.1

(Continued)

FOREIGN PATENT DOCUMENTS

KR  20110072205 A  6/2011

OTHER PUBLICATIONS

ISA/KR, International Search Report and Written Opinion of the International Searching Authority, Int'l Appl. No. PCT/US2021/044694, dated Nov. 17, 2021, Korean Intellectual property Office, Seo-gu, Daejeon, Republic of Korea, 16pgs.

*Primary Examiner* — Charles Rones
*Assistant Examiner* — Tong B. Vo
(74) *Attorney, Agent, or Firm* — Holland & Hart LLP

(57) ABSTRACT

Methods, systems, and devices for multi-stage memory device performance notification are described. A memory system may include a first set of memory cells of a first type associated with a first performance level and a second set of memory cells of a second type associated with a second performance level. The memory system may have an interface and a control circuit coupled with the first and second sets of memory cells. The control circuit may be configured to determine a first parameter associated with a transition between the first performance level and the second performance level. The control circuit may also be configured to store the first parameter in a first register based at least in part on determining the first parameter.

22 Claims, 7 Drawing Sheets

(56) References Cited

U.S. PATENT DOCUMENTS

| | | | |
|---|---|---|---|
| 2016/0313943 A1* | 10/2016 | Hashimoto | G06F 3/0659 |
| 2018/0081543 A1* | 3/2018 | Muchherla | G06F 11/34 |
| 2018/0260158 A1* | 9/2018 | Marripudi | G06F 11/34 |
| 2019/0073297 A1* | 3/2019 | Goss | G06F 3/0679 |
| 2019/0087299 A1* | 3/2019 | Yasuda | G06F 3/0679 |
| 2019/0095116 A1* | 3/2019 | Igahara | G06F 3/0619 |
| 2019/0114078 A1* | 4/2019 | Oh | G06F 3/0634 |
| 2020/0194075 A1* | 6/2020 | Igahara | G11C 16/08 |
| 2020/0379861 A1* | 12/2020 | Park | G06F 12/0246 |
| 2021/0081025 A1* | 3/2021 | Hou | G06F 1/3275 |
| 2021/0141565 A1* | 5/2021 | Jin | G06F 3/0611 |
| 2021/0405900 A1* | 12/2021 | Kurita | G06F 3/0659 |

\* cited by examiner

MULTI-STAGE MEMORY DEVICE PERFORMANCE NOTIFICATION

BACKGROUND

The following relates generally to one or more systems for memory and more specifically to multi-stage memory device performance notification.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
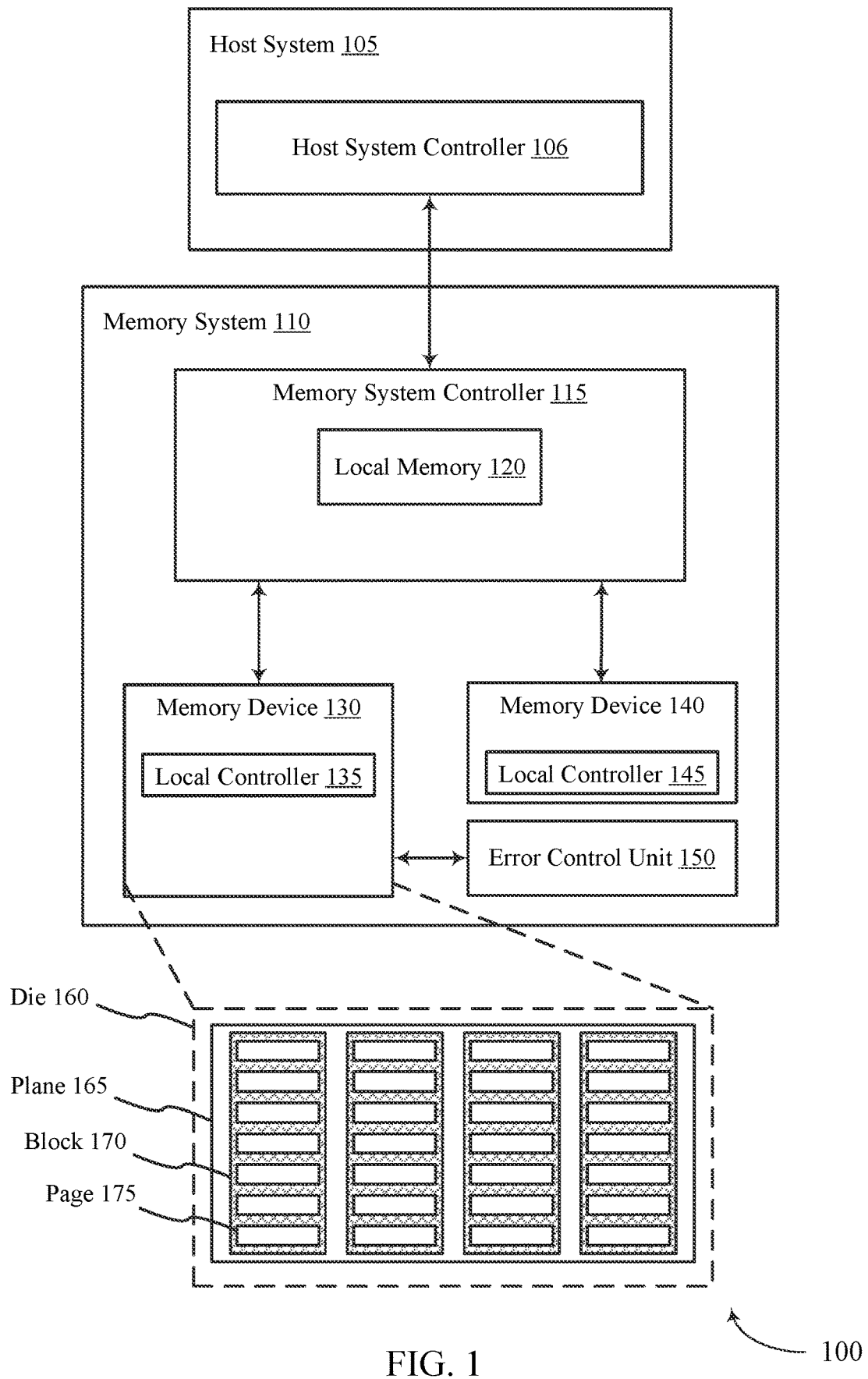
FIG. 1 illustrates an example of a system that supports multi-stage memory device performance notification in accordance with examples as disclosed herein.

A host system may initiate access operations (e.g., read, write, refresh operations) at a memory system by sending access commands. The memory system may complete the access operations at varying performance levels depending on various factors. For example, a memory system may receive a write command from a host system. In some examples, the write command may be associated with a sequential write—e.g., the set of data associated with one or more write commands is stored in contiguous memory locations. That is, memory cells in the memory system may be written to in a sequence corresponding to sequential logical block addresses (LBAs). In such examples, the memory system may have a sequential write performance profile that has multiple levels. For example, the memory system may have a sequential write performance profile that has three levels, which may be referred to as burst, sustain, and dirty. In some examples, the levels (e.g., burst and sustain) may be associated with devices of different memory types or with different types of memory cells. For example, when the memory system utilizes NAND memory, a level may be associated with a single level cell (SLC) or multi-level cell (MLC). Other levels (e.g., dirty) may be associated with performing memory organization or memory management operations such as garbage collection operations. In some examples, the sequential write operation may be performed in a shorter duration (e.g., faster) when associated with a first level (e.g., burst) than with a second level (e.g., sustain). The host system may be unaware of which level the memory system is operating at or when the memory system will transition from one level to another.

A computing system (e.g., one including the host system and memory system) may initiate benchmark tests to gauge the overall performance of the computing system. In some examples, the benchmark test may include employing sequential write operations. In such cases, the host system may send a sequential write command to the memory system. When the host system is unaware of which level the memory system is operating at or when a memory system will transition from one level to another, the performance of the benchmark test may be reduced. That is, a lack of coordination between the host system and the memory system may result in unexpected transitions between levels of the performance profile. For example, the memory system may start one or more sequential write operations at a first level but transition to a second level and slow the overall speed of the sequential write operations without the host being aware that such a transition will or did occur.

Systems, devices, and techniques are described herein for determining parameters associated with transitions between multiple levels of performance to provide information from the memory system to the host system for coordination to improve the efficiency of consuming resources in the different levels of memory performance. For example, the memory device may determine the remaining address space in each performance level (e.g., the burst or sustain level). That is, the memory system may determine how much space is available to store additional data in the memory cells while maintaining each performance level. In other examples, the memory system may determine a duration for recovery of a given performance level (e.g., the duration to recover to burst from sustain or to sustain from dirty). The memory system may store the parameters and information in registers accessible to the host system via an interface coupled with the memory system (e.g., a UFS interface). The host system may then request the parameters and information and the memory system may provide the parameters to the host system in response to the request. By knowing the remaining address space or duration for recovery of a given performance level, the host system and memory system may be better coordinated and improve the overall performance in a benchmark test or other sequential write operations.

Features of the disclosure are initially described in the context of systems and dies as described with reference to FIGS. 1 and 2. Features of the disclosure are described in the context sequential write performance profiles, data portions, and process flow diagrams as described with reference to FIGS. 3-5. These and other features of the disclosure are further illustrated by and described with reference to an apparatus diagram and flowcharts that relate to multi-stage memory device performance notification as described with reference to FIGS. 6-7.

Figure 2:
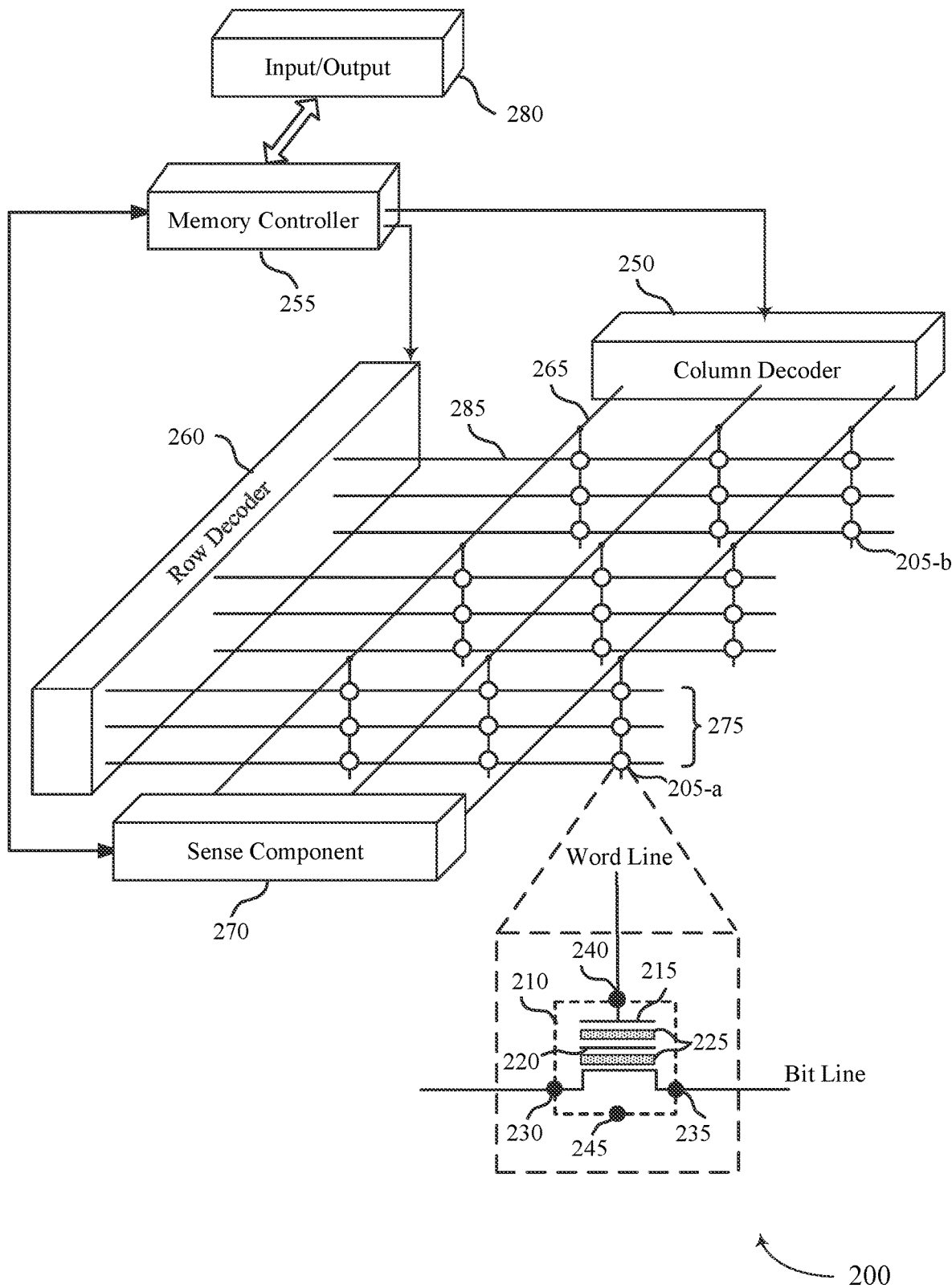
FIG. 2 illustrates an example of a memory die that supports multi-stage memory device performance notification in accordance with examples as disclosed herein.

FIG. 1 illustrates an example of a system 100 that supports multi-stage memory device performance notification in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells or a type of non-volatile memory cell different than memory device 140). In some examples, memory system 110 may utilize memory device 140 as a cache. Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, memory device 140 may include one or more array of non-volatile memory cells. For example, memory device 140 may include ferroelectric RAM (FeRAM) memory cells or 3D cross point (3DXP) memory cells. In some examples, a memory device 140 may support random access operations (e.g., by the host system 105) with reduced latency relative to a memory device 130, or may offer one or more other performance differences relative to a memory device 130. In other examples, the memory device 140 may support sequential write operation with reduced latency relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). In some examples, the NAND memory device 130 may utilize the SLC memory cells as a cache. That is, the SLC memory cells in a die 160 (e.g., a memory array) may be used as a cache for NAND memory device 130. Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. In some examples, the host system 105 may initiate garbage collection operations by sending a host active garbage collection (HAGC) command. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The memory device 130 may be in communication with an error control unit 150 (ECU). The ECU 150 may perform operations such as error detection operations, error correction operations, error correcting code operations, or a combination thereof. The local controller 135 may send information to and receive information from the ECU 150.

In some examples, the memory system 110 may receive one or more sequential write commands from the host system 105—e.g., the set of data associated with the sequential write commands is stored in contiguous memory locations. That is, memory cells in the memory system may be written to in a sequence corresponding to sequential LBAs. In such cases, the memory system 110 may operate at one of multiple levels of performance while executing the sequential write command. The host system 105 may be unaware of the level of performance the memory system 110 is operating at and consume resources inefficiently.

As described herein, the memory system 110 may determine parameters associated with a transition from one performance level to another performance level during the execution of a sequential write operation. The memory system 110 may store the parameters at a register accessible by the host (e.g., in memory system controller 115 or local memory 120). The memory system 110 may update the parameters based on subsequent sequential write operations or garbage collection operations performed. The host system 105 may request the parameters by sending a read command associated with the register the parameter is stored at. By requesting the parameters, the host system 105 may be able to more efficiently consume resources associated with a given performance level.

The system 100 may include any quantity of non-transitory computer readable media that support multi-stage memory device performance notification in accordance with examples as disclosed herein. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein FIG. 2 illustrates an example of a memory die 200 that supports multi-stage memory device performance notification in accordance with examples as disclosed herein. In some cases, the memory device 200 may be an example of a memory device 130 as described with reference to FIG. 1. FIG. 2 is an illustrative representation of various components and features of the memory device 200. As such, it should be appreciated that the components and features of the memory device 200 are shown to illustrate functional interrelationships, and not necessarily actual physical positions within the memory device 200. Further, although some elements included in FIG. 2 are labeled with a numeric indicator, some other corresponding elements are not labeled, even though they are the same or would be understood to be similar, in an effort to increase visibility and clarity of the depicted features.

The memory device 200 may include one or more memory cells, such as memory cell 205-a and memory cell 205-b. A memory cell 205 may be, for example, a flash or other type of NAND memory cell, such as in the blow-up diagram of memory cell 205-a.

Each memory cell 205 may be programmed to store a logic value representing one or more bits of information. In some cases, a single memory cell 205—such as an SLC memory cell 205—may be programmed to one of two supported states and thus may store one bit of information at a time (e.g., a logic 0 or a logic 1). In other cases, a single memory cell 205—such as an MLC, TLC, QLC, PLC or other type of multiple-level memory cell 205—may be programmed to one of more than two supported states and thus may store more than one bit of information at a time. In some examples, a single MLC memory cell 205 may be programmed to one of four supported states and thus may store two bits of information at a time corresponding to one of four logic values (e.g., a logic 00, a logic 01, a logic 10, or a logic 11). In some examples, a single TLC memory cell 205 may be programmed to one of eight supported states and thus may store three bits of information at a time corresponding to one of eight logic values (e.g., 000, 001, 010, 011, 100, 101, 110, or 111). In some examples, a single QLC memory cell 205 may be programmed to one of sixteen supported states and thus may store four bits of information at a time corresponding to one of sixteen logic values (e.g., 0000, 0001, . . . 1111). In some examples, a single PLC memory cell 205 may be programmed to one of thirty-two supported states and thus may store five bits of information at a time corresponding to one of thirty-two logic values (e.g., 00000, 00001, . . . 11111).

In some cases, a multiple-level memory cell 205 (e.g., an MLC memory cell, a TLC memory cell, a QLC memory cell) may be physically different than an SLC cell. For example, a multiple-level memory cell 205 may use a different cell geometry or may be fabricated using different materials. In some cases, a multiple-level memory cell 205 may be physically the same or similar to an SLC cell, and other circuitry in a memory block (e.g., a controller, sense amplifiers, drivers) may be configured to operate (e.g., read and program) the memory cell as an SLC cell, or as an MLC cell, or as a TLC cell, etc.

Different types of memory cells 205 may store information in different ways. In a DRAM memory array, for example, each memory cell 205 may include a capacitor that includes a dielectric material (e.g., an insulator) to store a charge representative of a programmable state and thus the stored information. In an FeRAM memory array, as another example, each memory cell 205 may include a capacitor that includes a ferroelectric material to store a charge or a polarization representative of a programmable state and thus the stored information.

Different types of memory cells 205 may be associated with different performance levels. For example, an SLC cell may be programmed to a logic state (e.g., store a logic state) in a first duration. Multiple-level memory cells (e.g., MLC, TLC, QLC, PLC) may be programmed to a logic state (e.g., store a logic state) in a second duration, where the first duration is shorter than the second duration. That is, an SLC memory cell may store a set of data faster than a multiple-level memory cell. In some examples, the different memory cells 205 may also be associated with different storage capacities. That is, as discussed above and elsewhere herein, the SLC memory cells may store one bit of information while multiple-level memory cells 205 may store multiple bits of information. Thus, the memory device 200 may utilize memory cells with higher performance and lower storage (e.g., SLC memory cells) as a cache. That is, the memory device 200 may utilize a memory array including SLC memory cells as a cache array.

In some NAND memory arrays (e.g., flash arrays), each memory cell 205 may include a transistor that has a floating gate or a dielectric material for storing an amount of charge representative of the logic value. For example, the blow-up in FIG. 2 illustrates a NAND memory cell 205-a that includes a transistor 210 (e.g., a metal-oxide-semiconductor (MOS) transistor) that may be used to store a logic value. The transistor 210 has a control gate 215 and may also include a floating gate 220, where the floating gate 220 is sandwiched between two portions of dielectric material 225. Transistor 210 includes a first node 230 (e.g., a source or drain) and a second node 235 (e.g., a drain or source). A logic value may be stored in transistor 210 by placing (e.g., writing, storing) a quantity of electrons (e.g., an amount of charge) on floating gate 220. The amount of charge to be stored on the floating gate 220 may depend on the logic value to be stored. The charge stored on floating gate 220 may affect the threshold voltage of transistor 210, thereby affecting the amount of current that flows through transistor 210 when transistor 210 is activated (e.g., when a voltage is applied to the control gate 215).

A logic value stored in transistor 210 may be sensed (e.g., as part of a read operation) by applying a voltage to the control gate 215 (e.g., to control node 240, via the word line 285) to activate transistor 210 and measuring (e.g., detecting, sensing) the resulting amount of current that flows through the first node 230 or the second node 235 (e.g., via a digit line 265). For example, a sense component 270 may determine whether an SLC memory cell 205 stores a logic 0 or a logic 1 in a binary manner (e.g., based on a presence or absence of a current through the memory cell 205 when a read voltage is applied to the control gate 215, or based on whether the current is above or below a threshold current). For a multiple-level memory cell 205, a sense component 270 may determine a logic value stored in the memory cell 205 based on various intermediate threshold levels of current when a read voltage is applied to the control gate 215. In one example of a multiple-level architecture, a sense component 270 may determine the logic value of a TLC memory cell 205 based on eight different levels of current, or ranges of current, that define the eight potential logic values that could be stored by the TLC memory cell 205.

An SLC memory cell 205 may be written by applying one of two voltages (e.g., a voltage above a threshold or a voltage below a threshold) to memory cell 205 to store, or not store, an electric charge on the floating gate 220 and thereby cause the memory cell 205 store one of two possible logic values. For example, when a first voltage is applied to the control node 240 (e.g., via the word line 285) relative to a bulk node 245 for the transistor 210 (e.g., when the control node 240 is at a higher voltage than the bulk), electrons may tunnel into the floating gate 220. In some cases, the bulk node 245 may alternatively be referred to as a body node.

Injection of electrons into the floating gate 220 may be referred to as programing the memory cell 205 and may occur as part of a program operation. A programmed memory cell may, in some cases, be considered as storing a logic 0. When a second voltage is applied to the control node 240 (e.g., via the word line 285) relative to the bulk node 245 for the transistor 210 (e.g., when the control node 240 is at a lower voltage than the bulk node 245), electrons may leave the floating gate 220. Removal of electrons from the floating gate 220 may be referred to as erasing the memory cell 205 and may occur as part of an erase operation. An erased memory cell may, in some cases, be considered as storing a logic 1. In some cases, memory cells 205 may be programmed at a page 175 level of granularity due to memory cells 205 of a page 175 sharing a common word line 285, and memory cells 205 may be erased at a block 170 level of granularity due to memory cells 205 of a block sharing commonly biased bulk nodes 245.

In contrast to writing an SLC memory cell 205, writing a multiple-level (e.g., MLC, TLC, or QLC) memory cell 205 may involve applying different voltages to the memory cell 205 (e.g., to the control node 240 or bulk node 245 thereof) at a finer level of granularity to more finely control the amount of charge stored on the floating gate 220, thereby enabling a larger set of logic values to be represented. Thus, multiple-level memory cells 205 may provide greater density of storage relative to SLC memory cells 205 but may, in some cases, involve narrower read or write margins or greater complexities for supporting circuitry.

A charge-trapping NAND memory cell 205 may operate similarly to a floating-gate NAND memory cell 205 but, instead of or in addition to storing a charge on a floating gate 220, a charge-trapping NAND memory cell 205 may store a charge representing a logic state in a dielectric material below the control gate 215. Thus, a charge-trapping NAND memory cell 205 may or may not include a floating gate 220.

In some examples, each row of memory cells 205 may be connected to a corresponding word line 285, and each column of memory cells 205 may be connected to a corresponding digit line 265. Thus, one memory cell 205 may be located at the intersection of a word line 285 and a digit line 265. This intersection may be referred to as an address of a memory cell 205. Digit lines 265 may alternatively be referred to as bit lines. In some cases, word lines 260 and digit lines 265 may be substantially perpendicular to one another and may create an array of memory cells 205. In some cases, word lines 260 and digit lines 265 may be generically referred to as access lines or select lines.

In some cases, memory device 200 may include a three-dimensional (3D) memory array, where multiple two-dimensional (2D) memory arrays may be formed on top of one another. This may increase the quantity of memory cells 205 that may be placed or fabricated on a single die or substrate as compared with 2D arrays, which, in turn, may reduce production costs, or increase the performance of the memory array, or both. In the example of FIG. 2, memory device 200 includes multiple levels (e.g., decks) of memory cell 205. The levels may, in some examples, be separated by an electrically insulating material. Each level may be aligned or positioned so that memory cells 205 may be aligned (e.g., exactly aligned, overlapping, or approximately aligned) with one another across each level, forming a memory cell stack 275. In some cases, a memory cell stack 275 may be referred to as a string of memory cells 205.

Accessing memory cells 205 may be controlled through row decoder 260 and column decoder 250. For example, row decoder 260 may receive a row address from memory controller 255 and activate an appropriate word line 285 based on the received row address. Similarly, column decoder 250 may receive a column address from memory controller 255 and activate an appropriate digit line 265. Thus, by activating one word line 285 and one digit line 265, one memory cell 205 may be accessed.

Upon accessing, a memory cell 205 may be read, or sensed, by sense component 270. For example, sense component 270 may be configured to determine the stored logic value of memory cell 205 based on a signal generated by accessing memory cell 205. The signal may include a current, a voltage, or both a current and a voltage on the digit line 265 for the memory cell 205 and may depend on the logic value stored by the memory cell 205. The sense component 270 may include various transistors or amplifiers configured to detect and amplify a signal (e.g., a current or voltage) on a digit line 265. The logic value of memory cell 205 as detected by the sense component 270 may be output via input/output component 280. In some cases, sense component 270 may be a part of column decoder 250 or row decoder 260, or sense component 270 may otherwise be connected to or in electronic communication with column decoder 250 or row decoder 260.

A memory cell 205 may be programmed or written by activating the relevant word line 285 and digit line 265 to enable a logic value (e.g., representing one or more bits of information) to be stored in the memory cell 205. A column decoder 250 or a row decoder 260 may accept data, for example from input/output component 280, to be written to the memory cells 205. As previously discussed, in the case of NAND memory, such as flash memory used in some NAND and 3D NAND memory devices, a memory cell 205 may be written by storing electrons in a floating gate or an insulating layer.

A memory controller 255 may control the operation (e.g., read, write, re-write, refresh) of memory cells 205 through the various components, for example, row decoder 260, column decoder 250, and sense component 270. In some cases, one or more of row decoder 260, column decoder 250, and sense component 270 may be co-located with memory controller 255. A memory controller 255 may generate row and column address signals in order to activate the desired word line 285 and digit line 265. In some examples, a memory controller 255 may generate and control various voltages or currents used during the operation of memory device 200.

A memory controller 255 may control the operation (e.g., read, write, re-write, refresh) of memory cells 205 through the various components, for example, row decoder 260, column decoder 250, and sense component 270. In some cases, one or more of row decoder 260, column decoder 250, and sense component 270 may be co-located with memory controller 255. A memory controller 255 may generate row and column address signals in order to activate the desired word line 260 and digit line 265. In some examples, a memory controller 255 may generate and control various voltages or currents used during the operation of memory device 200.

As described above and elsewhere herein, the memory cells in the memory device 200 may have varying performance levels. For example, when the memory device 200 performs a sequential write operation, SLC memory cells may execute the sequential write operation faster than multiple-level memory cells. In some examples, a host system (e.g., host system 105 as described with reference to FIG. 1) be unaware of which level of performance the memory device 200 is currently operating. In other examples, the host system may be unaware of when the memory device may transition from one performance level to another. That is, the host system may be unaware of how much more data the SLC memory cells may store before the memory device 200 transitions to storing data in multiple-level memory cells 205. Thus, even if the host system requests the memory device 200 store data at the SLC memory cells (e.g., in a write burst command), the memory device 200 may still have a change in performance levels as the available space in the SLC memory cells may run out. When the host system is unaware of the performance level or when a transition may occur, the overall system (e.g., system 100 as described with reference to FIG. 1) may utilize increased resources.

As described herein, the memory device 200 may determine parameters associated with the multiple levels of performance as it processes commands such as sequential write operations and store them at registers accessible by the host system. For example, the memory device 200 may determine the available address space remaining associated with the SLC memory cells. In some examples, the memory device 200 may also determine a duration to recover additional space in the SLC memory cells (e.g., a duration of a garbage collection operation at the SLC memory cells). The memory device 200 may also determine similar parameters for the multiple-level memory cells (e.g., how much address space is remaining and a duration to recover additional space). By allowing these parameters to be accessible to the host system, the memory device 200 may more efficiently consume resources associated with the multiple performance levels.

Figure 3:
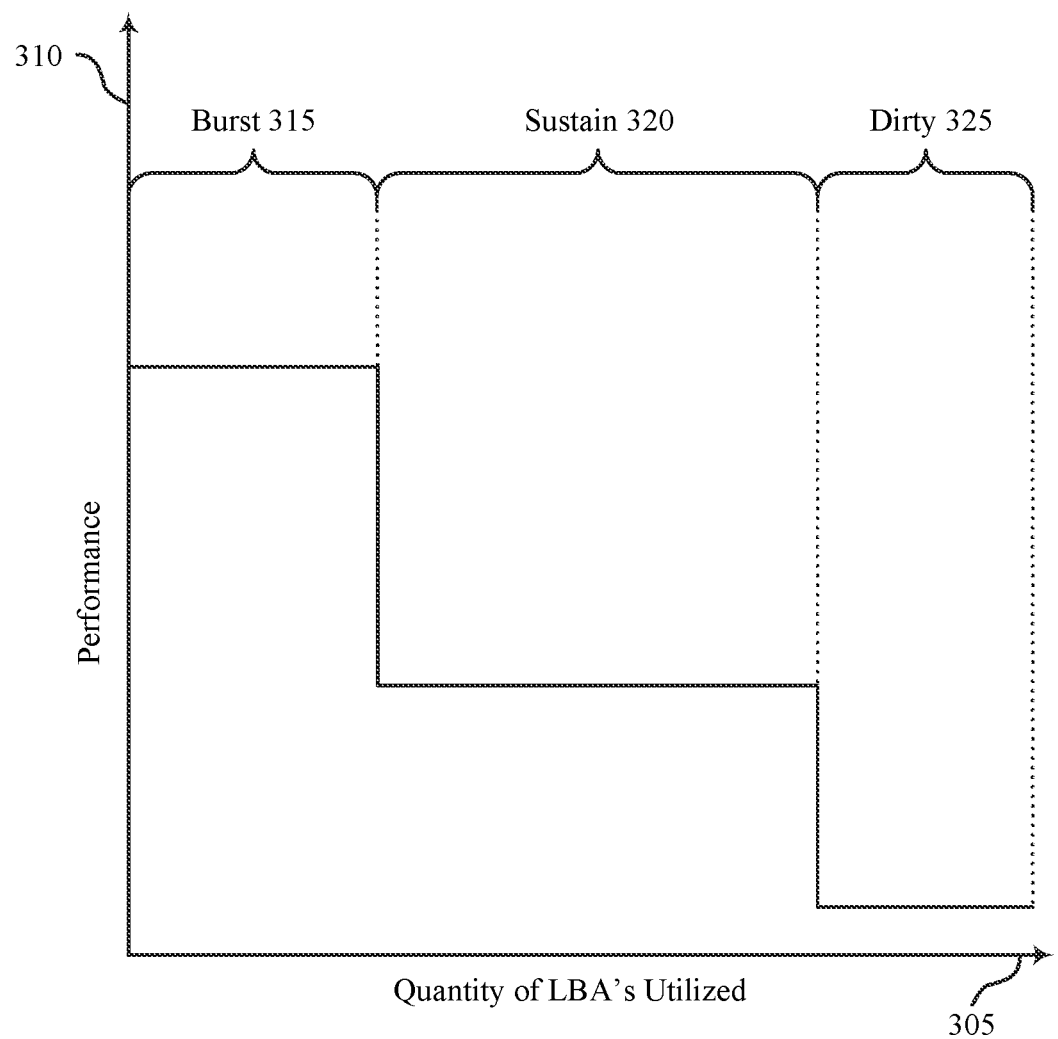
FIG. 3 illustrates an example of a sequential write performance profile that supports multi-stage memory device performance notification in accordance with examples as disclosed herein.

FIG. 3 illustrates an example of a sequential write performance profile 300 that supports multi-stage memory device performance notification in accordance with examples as disclosed herein. The sequential write performance profile 300 may be associated with write operations performed by a system or its components as described herein and with reference to a system as described in FIGS. 1 and 2. For example, the sequential write performance profile 300 may be associated with a host system (e.g., host system 105 as described with reference to FIG. 1) and a memory system (e.g., memory system 110 as described with reference to FIG. 1). The sequential write performance profile 300 may depict multiple performance levels a memory system may operate at during one or more sequential write operations.

The y-axis of sequential write performance profile 300 may represent the overall performance measured during a sequential write operation performed at the memory system. In some examples, performance 310 may be associated with a sequential write speed—e.g., how fast the memory system is storing data (e.g., writing data to memory cells) received from the host system. In other examples, performance 310 may be associated with a data transfer rate between the host system and the memory system—e.g., a measurement of how much data is transferred between the host system and the memory system during write operations over a given period.

The x-axis of sequential write performance profile 300 may represent quantity of LBA's utilized 305. For example, the memory system may have a quantity of available LBAs associated with a quantity of memory cells in the memory system. The sequential write performance profile 300 is depicted over the quantity of the LBAs utilized 305 to store data received from the host device.

Burst stage 315 may be associated with a first level of performance in the sequential write performance profile 300. In some examples, burst stage 315 may be associated with a cache of memory system. That is, burst stage 315 may be associated with a first set of memory cells (e.g., a first memory array) in the memory system that are used as cache. In some examples, the performance level of burst stage 315 may represent how quickly the first set of memory cells may be programmed (e.g., written to). In some cases, burst stage 315 may be associated with SLC memory cells. In other cases, burst stage 315 may be associated with a different memory type such as 3DXP or FeRAM memory. The memory associated with burst stage 315 may have relatively high sequential write speeds and burst stage 315 may have a higher overall performance compared with sustain stage 320 and dirty stage 325.

Sustain stage 320 may be associated with a second level of performance in the sequential write performance profile 300. In some examples, sustain stage 320 may be associated with a main storage memory of the memory system. For example, sustain stage 320 may be associated with a second set of memory cells (e.g., a second memory array) in the memory system. In some examples, the performance level of sustain stage 320 may represent how quickly the second set of memory cells may be programmed (e.g., written to). In some cases, sustain stage 320 may be associated with MLC, TLC, QLC, or PLC memory cells (e.g., as described with reference to FIG. 2). The memory associated with sustain stage 320 may have a relatively high storage capacity and as such the memory system may operate at the sustain stage longer or for more write operations than at the burst stage.

Dirty stage 325 may be associated with a third level of performance in the sequential write performance profile 300. In some examples, dirty stage 325 may be associated with a memory organization operation at the memory system. For example, dirty stage 325 may be associated with a garbage collection operation at the memory system. As the memory system is transferring data to new locations during a garbage collection operation (e.g., as discussed with reference to FIG. 1), the overall performance of a sequential write operation during the same time may be low. Although dirty stage 325 is shown as occurring after sustain stage 320, in some examples operations associated with dirty stage 325 may occur after or during burst stage 315 or sustain stage 320. That is, the host system may initiate memory organization operation at the memory system during any period and the performance during that memory organization operation may be represented by dirty stage 325.

During a sequential write operation initiated by the host system at the memory system, the host system may be unaware of which stage of the sequential write performance profile 300 the memory system is currently operating. In other examples, the host system may be unaware of when the memory system will transition from one level to another level of the sequential write performance profile 300. In either case, the overall performance of the sequential write operation may be reduced. For example, the host system may be unaware that during the performance of a sequential write command, the memory system will transition from burst stage 315 to sustain stage 320. In other examples, the host system may be unaware of the length of a memory organization operation and send a sequential write command while the memory system is freeing up additional space. Additionally or alternatively, the host system being unaware of the level of performance of the memory device may reduce the results of a benchmark test. That is, a system (e.g., system 100) may initiate a benchmark test and memory system may transition from one level of performance to another level of performance during the execution of the benchmark test. This may reduce the overall performance measured during the benchmark test.

As described herein, the memory system may inform the host of parameters associated with transitions between the performance levels so the host system may more efficiently consume resources at each performance level. For example, the memory system may determine the free address spaces for a corresponding performance level or the duration to recover a given performance level. By being aware of which stage the memory system is currently operating, the host system may be able to coordinate with the memory system to increase the overall performance of a sequential write operation, for example by modifying the sequence of operations to allow the memory system to remain in a stage or transition to a stage having a higher performance level. That is, the host system may be able to better coordinate with the memory system to increase a duration of time the memory system operates at stages having higher levels of performance such as burst stage 315.

Figure 4:
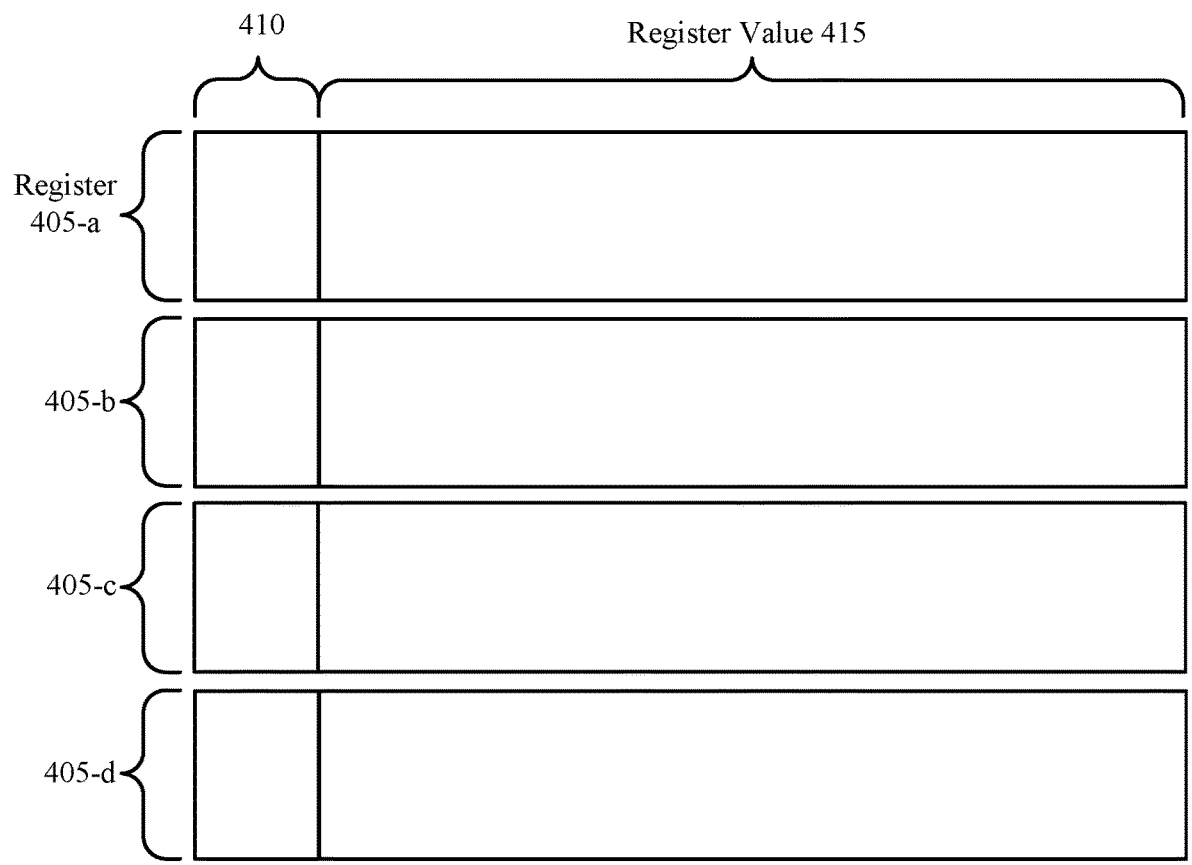
FIG. 4 illustrates an example of a registers that supports multi-stage memory device performance notification in accordance with examples as disclosed herein.

FIG. 4 illustrates an example of registers 400 that supports multi-stage memory device performance notification in accordance with examples as disclosed herein. In some examples, the registers 400 may be stored at a memory system (e.g., memory system 110 as described with reference to FIG. 1). In some examples, the registers 400 may be accessible to a host system (e.g., a host system 105 as described with reference to FIG. 1).

In this example, the registers 400 may have registers 405-a to 405-d. In other examples, the registers 400 may include more than or less than four (4) registers 405. Registers 405 may be configured to store information, parameters, and commands signals (e.g., commands for access operations, wear leveling operations, ECC operations, initialization operations, as described with reference to FIG. 1). The registers 405 may be configured to be accessible to the host system. Each register may also be configured to have the following attributes: a name, an access property, a size, a type, an MDV, a description, and a note. The name may be configured to indicate the name of a specified register 405. The access property may indicate whether a given register 405 can be read from or written to by a host system—e.g., the type of access that may be performed on a given register 405. The size may be configured to indicate the size of the data stored in each register 405. The size may have various granularities—e.g., the size may be in kB (kilobytes) or MB (megabytes). The type may be configured to identify a device level attribute or an array of attributes. In some examples, the type may also include "#Ind." information that specifies an amount of valid values in an index field. When the type identifies an array of attributes, the type may include an additional "#Sel." value that indicates an amount of valid values of the selector field. The MDV may be configured to indicate a manufacturer default value (MDV) that specifies attribute values after device manufacturing. The description may be configured to explain or identify the purpose of a register value 415 stored in each register 405. The note may be configured to indicate additional information not specified in the other attributes of each register 405.

Each register 405 may also include a register address 410 and the register value 415. The register address may be a value configured to indicate the particular type of descriptor to retrieve. For example, the register address 410 may indicate a device descriptor, unit descriptor, or string descriptor to select the register 405. The register value 415 may be the data, parameter, or value stored in each register 405.

As described herein and with reference to FIG. 3, the memory system may have multiple performance stages (e.g., the sequential write performance profile 300 as described with reference to FIG. 3) associated with performing a sequential write operation. To avoid extra consumption of resources, the memory system may be configured to notify the host system of various parameters associated with a given stage or a transition from one stage or performance stage to another. The memory system may store these parameters at the registers 405-a to 405-d. The host system may subsequently send a read command to read the parameters from the registers 405-a to 405-d.

For example, register 405-a may store a parameter associated with remaining LBA space for the burst stage (e.g. burst stage 315 as described with reference to FIG. 3) performance as the register value 415. In such examples, register 405-a may have a value 40h for the register address 410. The other attributes of register 405-a may include a name "remaining LBA space for burst write performance", a read only access property, a size of four (4) bytes, a value A/LU/0 or D for the type, a value 00h for the MDV. The description may indicate the parameter stored as the register value 415 is associated with a quantity of space available in the memory associated with the burst stage. For example, the memory system may determine a quantity of memory cells associated with the burst stage (e.g., a first set of memory cells) that are available to store data written to the memory system received from the host system. The memory system may then determine a size associated with the quantity of memory cells available and store the information in the in the register value 415 of the register 405-a. The register value 415 may indicate the size in kB, MB, GB (gigabyte), TB (terabyte), etc., increments depending on the storage capacity of the memory system. The granularity of the size may vary depending on the size of the memory system. As an example of a parameter stored in the register 405-a, the register value 415 may indicate there is no free space available in the memory associated with the burst stage. In other examples, the register value 415 may indicate there is one (1) MB of space available in the memory associated with the burst.

In some examples, register 405-b may store a parameter associated with remaining LBA space for the sustain stage (e.g. sustain 320 as described with reference to FIG. 3) performance as the register value 415. In such examples, register 405-b may have a value 41h for the register address 410. The other attributes of register 405-b may include a name "remaining LBA space for sustain write performance", a read only access property, a size of four (4) bytes, a value A/LU/0 or D for the type, a value 00h for MDV. The description may indicate the parameter stored as the register value 415 is associated with a quantity of space available in the memory associated with the sustain stage. For example, the memory system may determine a quantity of memory cells associated with the sustain stage (e.g., a second set of memory cells) that are available to store data written to the memory system received from the host system. The memory system may then determine a size associated with the quantity of memory cells available and store the information in the register value 415 of register 405-b. As described above, the register value 415 may indicate the size in kB, MB, GB, TB, etc., increments depending on the storage capacity of the memory system. Additionally or alternatively, the granularity of size utilized in register value 415 of register 405-b may be the same as or different than the granularity of size utilized in the register value 415 of register 405-a. For example, the register value 415 in register 405-*b* may indicate there is one (1) GB of space available in the memory associated with the sustain.

In some examples, register 405-*c* may store a parameter that represents a duration associated with transitioning from the sustain stage back to the burst stage as the register value 415. That is, the memory system may determine a parameter that indicates the duration to recover to burst stage from the sustain stage. The duration to recover may be associated with a memory organization operation utilized to free space in each performance level. For example, the memory system may initiate a garbage collection operation to free additional space in the memory associated with the burst stage and the parameter may indicate the duration of the garbage collection operation. For example, when the parameter represents a duration with transitioning from the sustain stage back to the burst stage, register 405-*c* may have a value 42h for the register address 410. The other attributes of register 405-*c* may include a name "recovery time for burst write from sustain write", a read only access property, a size of four (4) bytes, a value A/LU/0 or D for the type 30, a value 00h for MDV. The description may indicate the parameter stored as the register value 415 is associated with a quantity of time that will be utilized to recover the burst level from the sustain level. For example, the register value 415 may indicate that the memory system will take ten (10) seconds to recover to burst stage from sustain stage. The quantity of time may have different granularities—e.g., nanoseconds, milliseconds, seconds, minutes, hours, etc.—depending on the storage capacity of the memory system and size of the memory organization operation.

In some examples, register 405-*d* may store a parameter that represents a duration associated with transitioning from the dirty stage back to the sustain stage as the register value 415. That is, the memory system may determine a parameter that indicates the duration to recover to sustain stage from the dirty stage. For example, the memory system may initiate a garbage collection operation to free additional space in the memory associated with the sustain and the parameter may indicate the duration of the garbage collection operation. When the parameter represents a duration with transitioning from the dirty stage back to the sustain stage, register 405-*d* may have a value 43h for the register address 410. The other attributes of register 405-*d* may include a name "recovery time for sustain write from dirty write", a read only access property, a size of four (4) bytes, a value A/LU/0 or D for the type, a value 00h for MDV. The description may indicate the parameter stored as the register value 415 is associated with a quantity of time that will be utilized to recover the sustain level from the dirty level. For example, the register value 415 may indicate that the memory system will take 40 seconds to recover to sustain stage from the dirty stage. The granularity of register value 415 in register 405-*d* may be different than or the same as the granularity of the register value 415 in register 405-*c*—e.g., in minutes rather than seconds.

It should be noted, the examples listed above for the values of register addresses 410 and other attributes, including the name, access property, size, type, MDV, description, and note are not limiting. That is, the registers 405 may have addresses, values, or attributes other than those described herein.

Figure 5:
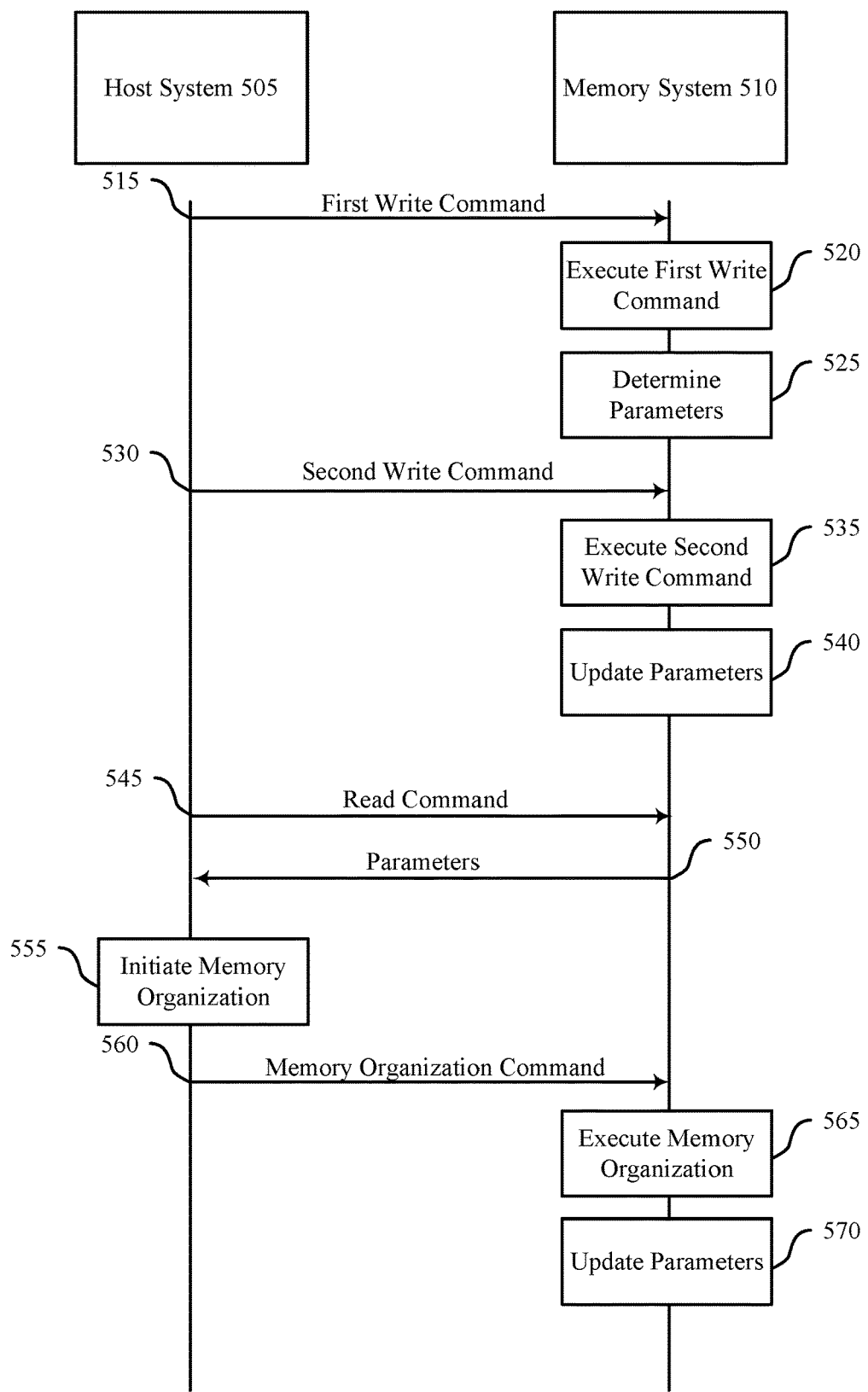
FIG. 5 illustrates an example of a process flow diagram that supports multi-stage memory device performance notification in accordance with examples as disclosed herein.

FIG. 5 illustrates an example of a process flow diagram 500 that supports multi-stage memory device performance notification in accordance with examples as disclosed herein. The process flow diagram 500 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the process flow diagram 500 may be performed by a system (e.g., system 100) as described with reference to FIG. 1. For example, the process flow diagram 500 may be performed by a host system 505 (e.g., host system 105 as described with reference to FIG. 1) and a memory system 510 (e.g., memory system 110 as described with reference to FIG. 2). In some examples, a memory system may execute a set of codes to control the functional elements of the memory device to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

At 515, a first write command may be received. For example, memory system 510 may receive the first write command from the host system 505. The first write command may be received at a memory system controller (e.g., memory system controller 115 as described with reference to FIG. 1). In some examples, the memory system may receive a first write command associated with a sequential write operation. The memory system controller may receive additional write commands from the host system, each additional write command associated with different data.

At 520, a first write command may be executed. For example, the memory system 510 may execute the first write command. The memory system controller may initiate a write operation on a set of memory cells associated with the first write command and write a set of data associated with the first write command to the set of memory cells. In some examples, the first write command may be a sequential write command (e.g., as described with reference to FIG. 1).

At 525, parameters may be determined. For example, the memory system controller may determine parameters after executing the first write command. In some examples, the parameters may be associated with a transition between performance levels as described with reference to FIG. 4. For example, the memory system may determine a quantity of space available to store data in memory associated with a burst (e.g., burst stage 315 as described with reference to FIG. 3) or sustain (e.g., sustain stage 320 as described with reference to FIG. 3) level of performance. In other examples, the memory system may determine the duration associated with recovering to the burst stage from the sustain stage or recovering to the sustain stage from the dirty stage. The parameters may be determined based on executing the write command. That is, the memory system may determine the quantity of space available to store data in the memory associated with the burst stage based on the quantity of data stored in the memory associated with the burst stage during the execution of the first write command.

At 530, a second write command may be received. For example, memory system 510 may receive the second write command from the host system 505. The second write command may be received at a memory system controller. In some examples, the memory system may receive a second write command associated with a sequential write operation.

At 535, a second write command may be executed. For example, the memory system 510 may execute the second write command. The memory system controller may initiate a write operation on a set of memory cells associated with the second write command and write a set of data associated with the second write command to the set of memory cells. In some examples, the second write command may be a sequential write command.

At 540, parameters may be updated. For example, the memory system controller may update parameters after executing the second write command. In some examples, executing the second write command received may change the amount of space available in a memory associated with the burst or sustain stages. In such examples, the memory system controller may update the parameters determined with reference to 525. For example, the second write command may occur while the memory is associated with the burst stage. After executing the second write command, the memory system may determine the quantity of space available in the memory associated with the burst stage has decreased. The memory system may accordingly update the register storing the parameter associated with remaining space (e.g., LBA space) for the burst stage. Alternatively, the second write command may occur while the memory is associated with the sustain stage. The memory system may update the register storing the parameter associated with remaining space (e.g., LBA space) for the sustain stage or the duration associated with recovering from the sustain stage to the burst stage. Yet alternatively, the second write command may occur while the memory is associated with the dirty stage. The memory system may update the register storing the parameter associated with the duration associated with recovering to the sustain stage from the dirty stage.

At 545, a read command may be received. For example, memory system 510 may receive the read command from the host system 505. The read command may be received at a memory system controller. In some examples, the memory system may receive a read command associated with a register (e.g., register 405 as described with reference to FIG. 4) storing the one or more parameters determined by the memory system at 525 or 540. The host system may request one or more of the parameters to determine the level the memory system is operating at while executing a sequential write operation. For example, the host system 505 may request the quantity of space available to store data in memory associated with the burst stage.

At 550, the memory system 510 may output the one or more parameters determined by the memory system at 525 or 540 to the host system 505. The parameters sent by the memory system may be associated with the read command received at 545. That is, the memory system may output a first parameter (e.g., the quantity of space available to store data in memory associated with the burst stage) if the read command received from the host system 505 requested the first parameter. The parameters may be read from the registers.

At 555, a memory organization operation may be initiated. For example, the host system 505 may initiate a memory organization operation. After receiving the parameters from the memory system 510, the host system 505 may be aware of the current level of performance at the memory system 510 and when the memory system 510 may transition to another performance level while executing a sequential write operation. That is, the host system 505 may utilize the parameters to better coordinate with the memory system 510 and use resources more efficiently. For example, the host system 505 may determine that a next sequential write command to be sent to the memory system 510 is associated with a first size of data. The parameter corresponding to the size available to store data in memory associated with the burst may have a second size. If the host system 505 determines the first size is greater than the second size (e.g., the write command will cause the memory system to transition from burst to sustain during the execution), the host system 505 may initiate a memory organization operation (e.g., garbage collection operation) to increase the amount of available space in the memory associated with the burst. For example, the host system 505 may determine that a benchmark test to be initiated has a size of two GBs but the available size in the memory associated with the burst is one GB. In such a case, the host system 505 may initiate a garbage collection operation to free up at least one GB of space at the memory associated with the burst before initiating the benchmark test. In other examples, the host system 505 may utilize the duration associated with transition from one performance level to another to schedule the memory organization operation. For example, if the host system 505 is aware it will take ten (10) minutes to recover burst from sustain, the host system 505 may initiate the memory organization operation when the system (e.g., system 100 as described with reference to FIG. 1) is less active—e.g., if the system is a smartphone, the host system 505 may initiate a memory organization operation when the user is less active, like when one or more applications are in a sleep or inactive state. By being aware of the parameters, the host system 505 may utilize resources more efficiently.

At 560, a memory organization command may be received. For example, memory system 510 receives the memory organization command from the host system 505. The memory organization command may be received at a memory system controller.

At 565, a memory organization operation may be executed. For example, the memory system 510 may execute the memory organization operation. In some examples, the memory system may execute the memory organization operation by transferring data. For example, the memory system 510 may transfer data (e.g., invalid data) stored in the memory associated with the burst stage to memory associated with the sustain stage. In other examples, the memory system 510 may execute the memory organization operation by erasing data (e.g., invalid data) from the memory associated with the sustain stage. In either case, the performance level of the memory system 510 while executing the memory organization operation may be at a dirty stage (e.g., dirty stage 325 as described with reference to FIG. 3). In some examples, while executing the memory organization operation, a set of memory cells associated with the memory organization operation may be idle. That is, if the memory system 510 receives additional write commands associated with the set of memory cells, the memory system 510 may terminate and suspend the memory organization operation. In such cases, the memory system 510 may wait for an additional memory organization command before completing the terminated and/or suspended memory organization operation.

At 570, parameters may be updated. For example, the memory system controller may update parameters after executing the memory organization operation. In some examples, executing the memory organization operation may change the amount of space available in a memory associated with the burst and sustain stages. In such examples, the memory system controller may update the parameters determined with reference to 525 or 540. For example, after executing the memory organization operation, the memory system 510 may determine the quantity of space available in the memory associated with the burst stage has increased. In cases where the memory organization operation was suspended or terminated (e.g., as described with reference to 565), the memory system 510 may update the duration associated with recovering either the burst or sustain stage. This may enable the host system 505 to send a subsequent read command to receive the information and determine how much additional time will be utilized to complete the terminated memory organization operation. The host system 505 may send a subsequent memory organization command to complete memory organization operation when the system is less active as described with reference to 555.

Figure 6:
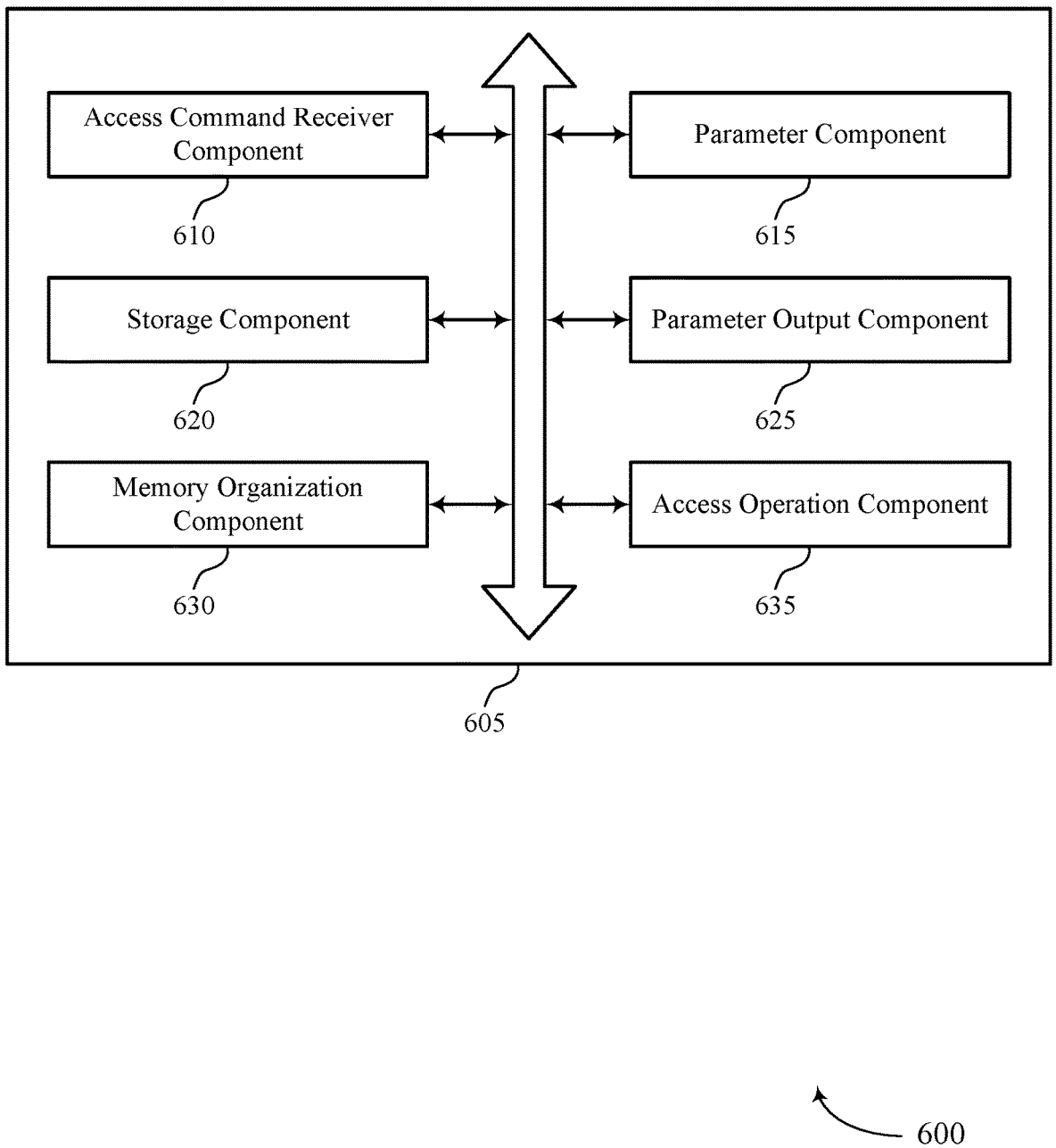
FIG. 6 shows a block diagram of a memory system that supports multi-stage memory device performance notification in accordance with aspects of the present disclosure.

FIG. 6 shows a block diagram 600 of a memory system 605 that supports multi-stage memory device performance notification in accordance with examples as disclosed herein. The memory system 605 may be an example of aspects of a memory system as described with reference to FIGS. 1-5. The memory system 605 may include an access command receiver component 610, a parameter component 615, a storage component 620, a parameter output component 625, a memory organization component 630, and an access operation component 635. Each of these modules may communicate, directly or indirectly, with one another (e.g., via one or more buses).

The access command receiver component 610 may receive a set of access commands associated with a first set of memory cells of a first type and a second set of memory cells of a second type, where a first performance level is associated with access for the first set of memory cells and a second performance level is associated with access for the second set of memory cells. In some examples, the access command receiver component 610 may receive a read command associated with the first register after storing the first parameter. In some cases, the access command receiver component 610 may receive a read command associated with the second register after storing the second parameter. In some instances, the access command receiver component 610 may receive a command to initiate a memory organization operation associated with the first set of memory cells and the second set of memory cells. In some examples, the access command receiver component 610 may receive an access command associated with the first set of memory cells.

The parameter component 615 may determine a first parameter associated with a transition between the first performance level and the second performance level based on receiving the set of access commands. In some examples, the parameter component 615 may determine a quantity of memory cells in the first set of memory cells available to store data written to the memory system, where the first parameter indicates the quantity. In some cases, the parameter component 615 may determine a duration associated with transitioning from the second performance level to the first performance level, where the first parameter indicates the duration.

In some instances, the parameter component 615 may determine a second parameter associated with a transition between the second performance level and a third performance level. In some examples, the parameter component 615 may determine a quantity of memory cells in the second set of memory cells available to store data written to the memory system, where the second parameter indicates the quantity. In some cases, the parameter component 615 may determine a duration associated with transitioning from the third performance level to the second performance level, where the second parameter indicates the duration. In some instances, the parameter component 615 may update the first parameter stored in the first register based on initiating the memory organization operation. In some examples, the parameter component 615 may update the first parameter stored in the first register based on terminating the memory organization operation.

The storage component 620 may store the first parameter in a first register based on determining the first parameter. In some examples, the storage component 620 may store the second parameter in a second register based on determining the second parameter. In some cases, the first set of memory cells in storage component 620 are associated with a cache memory array of the memory system.

The parameter output component 625 may output the first parameter from the first register based on receiving the read command. In some examples, the parameter output component 625 may output the second parameter from the second register.

The memory organization component 630 may initiate the memory organization operation based on receiving the command. In some examples, the memory organization component 630 may transfer a set of data from the first set of memory cells to the second set of memory cells based on initiating the memory organization operation. In some instances, the memory organization component 630 may terminate the memory organization operation based on receiving the access command.

The access operation component 635 may perform an access on the first set of memory cells associated with the first performance level in a first duration. In some cases, access operation component 635 may perform an access on the second set of memory cells associated with the second performance level in a second duration, the second duration exceeding the first duration.

Figure 7:
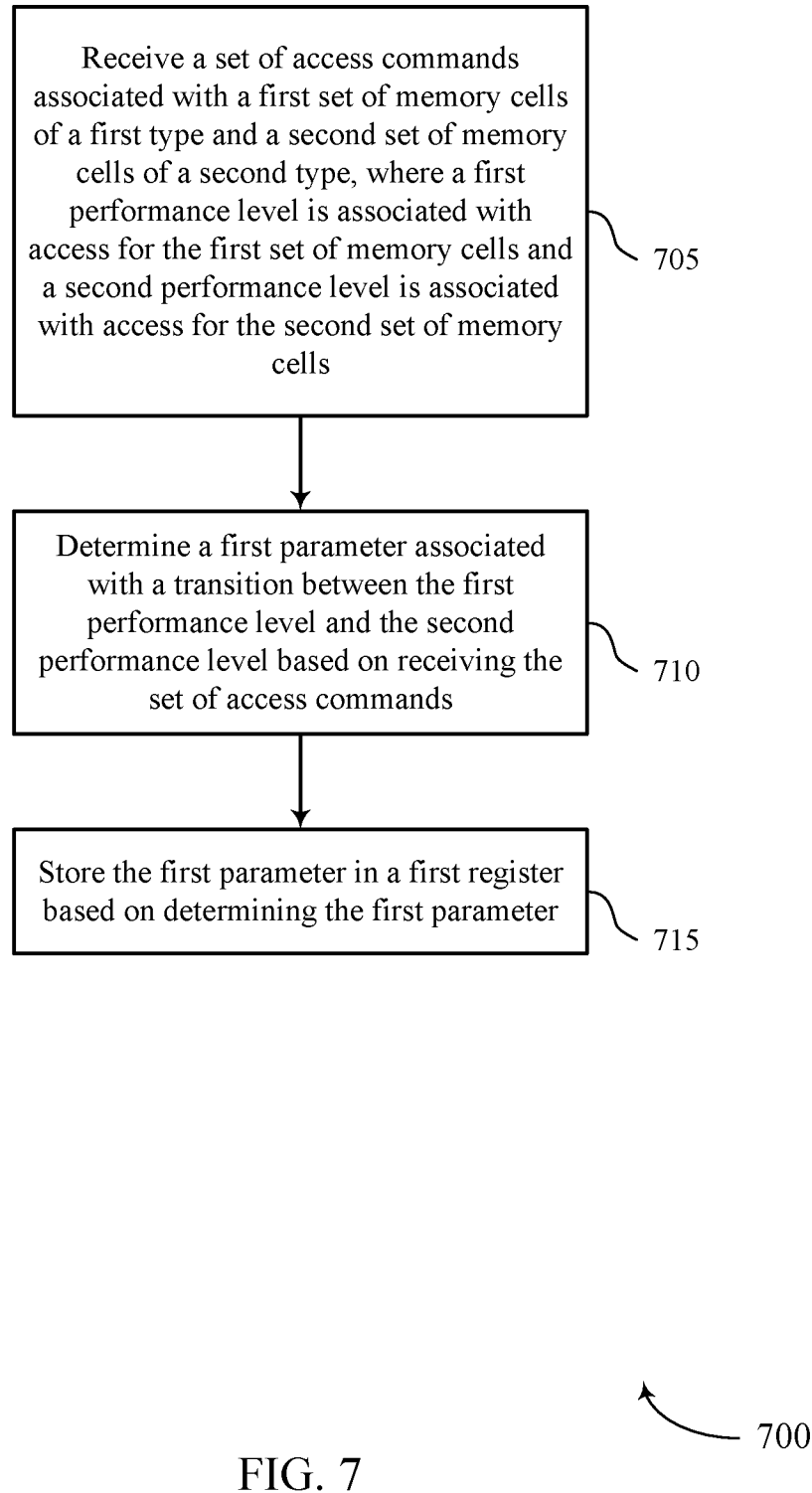
FIG. 7 shows a flowchart illustrating a method or methods that support multi-stage memory device performance notification in accordance with examples as disclosed herein.

FIG. 7 shows a flowchart illustrating a method or methods 700 that supports multi-stage memory device performance notification in accordance with aspects of the present disclosure. The operations of method 700 may be implemented by a memory system or its components as described herein. For example, the operations of method 700 may be performed by a memory system as described with reference to FIG. 6. In some examples, a memory system may execute a set of instructions to control the functional elements of the memory system to perform the described functions. Additionally or alternatively, a memory system may perform aspects of the described functions using special-purpose hardware.

At 705, the memory system may receive a set of access commands associated with a first set of memory cells of a first type and a second set of memory cells of a second type, where a first performance level is associated with access for the first set of memory cells and a second performance level is associated with access for the second set of memory cells. The operations of 705 may be performed according to the methods described herein. In some examples, aspects of the operations of 705 may be performed by an Access command receiver component as described with reference to FIG. 6.

At 710, the memory system may determine a first parameter associated with a transition between the first performance level and the second performance level based on receiving the set of access commands. The operations of 710 may be performed according to the methods described herein. In some examples, aspects of the operations of 710 may be performed by a parameter component as described with reference to FIG. 6.

At 715, the memory system may store the first parameter in a first register based on determining the first parameter. The operations of 715 may be performed according to the methods described herein. In some examples, aspects of the operations of 715 may be performed by a storage component as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving a set of access commands associated with a first set of memory cells of a first type and a second set of memory cells of a second type, where a first performance level is associated with access for the first set of memory cells and a second performance level is associated with access for the second set of memory cells, determining a first parameter associated with a transition between the first performance level and the second performance level based on receiving the set of access commands, and storing the first parameter in a first register based on determining the first parameter.

In some cases of the method 700 and the apparatus described herein, determining the first parameter may include operations, features, means, or instructions for determining a quantity of memory cells in the first set of memory cells available to store data written to the memory system, where the first parameter indicates the quantity.

In some instances of the method 700 and the apparatus described herein, determining the first parameter may include operations, features, means, or instructions for determining a duration associated with transitioning from the second performance level to the first performance level, where the first parameter indicates the duration.

Some examples of the method 700 and the apparatus described herein may further include operations, features, means, or instructions for receiving a read command associated with the first register after storing the first parameter, and outputting the first parameter from the first register based on receiving the read command.

Some cases of the method 700 and the apparatus described herein may further include operations, features, means, or instructions for determining a second parameter associated with a transition between the second performance level and a third performance level, and storing the second parameter in a second register based on determining the second parameter.

In some instances of the method 700 and the apparatus described herein, determining the second parameter may include operations, features, means, or instructions for determining a quantity of memory cells in the second set of memory cells available to store data written to the memory system, where the second parameter indicates the quantity.

In some examples of the method 700 and the apparatus described herein, determining the second parameter may include operations, features, means, or instructions for determining a duration associated with transitioning from the third performance level to the second performance level, where the second parameter indicates the duration.

Some cases of the method 700 and the apparatus described herein may further include operations, features, means, or instructions for receiving a read command associated with the second register after storing the second parameter, and outputting the second parameter from the second register.

Some instances of the method 700 and the apparatus described herein may further include operations, features, means, or instructions for receiving a command to initiate a memory organization operation associated with the first set of memory cells and the second set of memory cells, initiating the memory organization operation based on receiving the command, and updating the first parameter stored in the first register based on initiating the memory organization operation.

Some examples of the method 700 and the apparatus described herein may further include operations, features, means, or instructions for transferring a set of data from the first set of memory cells to the second set of memory cells based on initiating the memory organization operation.

Some cases of the method 700 and the apparatus described herein may further include operations, features, means, or instructions for receiving an access command associated with the first set of memory cells, terminating the memory organization operation based on receiving the access command, and updating the first parameter stored in the first register based on terminating the memory organization operation.

In some instances of the method 700 and the apparatus described herein, the first performance level may be associated with a first duration to perform an access on the first set of memory cells, and the second performance level may be associated with a second duration to perform an access on the second set of memory cells, the second duration exceeding the first duration.

In some examples of the method 700 and the apparatus described herein, the first set of memory cells may be associated with a cache memory array of the memory system.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a first set of memory cells of a first type and a second set of memory cells of a second type, where a first performance level is associated with access for the first set of memory cells of the first type and a second performance level is associated with access for the second set of memory cells of the second type, an interface coupled with the first set of memory cells and the second set of memory cells, a control circuit coupled with the interface, the first set of memory cells, and the second set of memory cells, where the control circuit is configured to, determine a first parameter associated with a transition between the first performance level and the second performance level, and store the first parameter in a first register based on determining the first parameter.

In some cases, the control circuit may be further configured to determine a quantity of memory cells in the first set of memory cells available to store data written to the memory system, where the first parameter indicates the quantity.

In some examples, the control circuit may be further configured to determine a duration associated with transitioning from the second performance level to the first performance level, where the first parameter indicates the duration.

In some instances, the control circuit may be further configured to receive a read command associated with the first register after storing the first parameter and output the first parameter from the first register based on receiving the read command.

In some cases, the control circuit may be further configured to determine a second parameter associated with a transition between the second performance level and a third performance level and store the second parameter in a second register based on determining the second parameter.

In some examples, the control circuit may be further configured to determine a quantity of memory cells in the second set of memory cells available to store data written to the memory system, where the second parameter indicates the quantity.

In some instances, the control circuit may be further configured to determine a duration associated with transitioning from the third performance level to the second performance level, where the second parameter indicates the duration.

In some cases, the control circuit may be further configured to receive a read command associated with the second register after storing the second parameter, and output the second parameter from the second register.

In some examples, the control circuit may be further configured to receive a command to initiate a memory organization operation associated with the first set of memory cells and the second set of memory cells, initiate the memory organization operation based on receiving the command, and update the first parameter stored in the first register based on initiating the memory organization operation.

In some instances, the control circuit may be further configured to transfer a set of data from the first set of memory cells to the second set of memory cells based on initiating the memory organization operation.

In some cases, the control circuit may be further configured to receive an access command associated with the first set of memory cells, terminate the memory organization operation based on receiving the access command, and update the first parameter stored in the first register based on terminating the memory organization operation.

In some examples, the first performance level may be associated with a first duration to perform an access on the first set of memory cells, and the second performance level may be associated with a second duration to perform an access on the second set of memory cells, the second duration exceeding the first duration.

In some instances, the first set of memory cells may be associated with a cache memory array of the memory system.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed by a memory system, comprising:
   receiving a plurality of access commands associated with a first set of memory cells of a first type and a second set of memory cells of a second type, wherein a first performance level is associated with an access for the first set of memory cells and a second performance level is associated with an access for the second set of memory cells;
   initiating a first transition from the first performance level to the second performance level;
   determining a first parameter that indicates a duration until a second transition from the second performance level to the first performance level based at least in part on receiving the plurality of access commands;
   storing, in a first register, the first parameter for providing to a host device, wherein the first parameter indicates the duration until the second transition, the storing based at least in part on determining the first parameter; and
   providing the first parameter to the host device after storage of the first parameter.

2. The method of claim 1, further comprising:
   determining a quantity of memory cells in the first set of memory cells available to store data written to the memory system; and storing, in a second register, a second parameter associated with the quantity of memory cells based at least in part on determining the quantity of memory cells.

3. The method of claim 1, further comprising:
receiving a read command associated with the first register after storing the first parameter; and
outputting the first parameter from the first register based at least in part on receiving the read command.

4. The method of claim 1, further comprising:
determining a third parameter associated with a third transition from a third performance level to the second performance level; and
storing the third parameter in a third register based at least in part on determining the third parameter.

5. The method of claim 4, wherein determining the third parameter comprises:
determining a quantity of memory cells in the second set of memory cells available to store data written to the memory system, wherein the third parameter indicates the quantity of memory cells.

6. The method of claim 4, wherein determining the third parameter comprises:
determining a duration until the third transition from the third performance level to the second performance level, wherein the third parameter indicates the duration until the third transition.

7. The method of claim 4, further comprising:
receiving a read command associated with the third register after storing the third parameter; and
outputting the third parameter from the third register.

8. A non-transitory computer-readable medium storing code comprising instructions, which when executed by a processor of an electronic device, cause the electronic device to:
initiate a first transition from a first performance level to a second performance level, wherein the first performance level is associated with an access for a first set of memory cells of a first type and the second performance level is associated with an access for a second set of memory cells of a second type;
determine a first parameter that indicates a duration until a second transition from the second performance level to the first performance level;
store, in a first register, the first parameter for providing to a host device, wherein the first parameter indicates the duration until the second transition, the storing based at least in part on determining the first parameter; and
provide the first parameter to the host device after storage of the first parameter.

9. The non-transitory computer-readable medium of claim 8, wherein the instructions, when executed by the processor of the electronic device, further cause the electronic device to:
determine a quantity of memory cells in the first set of memory cells available to store data written to a memory system; and
store, in a second register, a second parameter associated with the quantity of memory cells based at least in part on determining the quantity of memory cells.

10. The non-transitory computer-readable medium of claim 8, wherein the instructions, when executed by the processor of the electronic device, further cause the electronic device to:
receive a read command associated with the first register after storing the first parameter; and
output the first parameter from the first register based at least in part on receiving the read command.

11. A memory system comprising:
a first set of memory cells of a first type and a second set of memory cells of a second type, wherein a first performance level is associated with an access for the first set of memory cells of the first type and a second performance level is associated with an access for the second set of memory cells of the second type;
an interface coupled with the first set of memory cells and the second set of memory cells; and
a control circuit coupled with the interface, the first set of memory cells, and the second set of memory cells, wherein the control circuit is configured to:
initiate a first transition from the first performance level to the second performance level;
determine a first parameter that indicates a duration until a second transition from the second performance level to the first performance level;
store, in a first register, the first parameter for providing to a host device, wherein the first parameter indicates the duration until the second transition, the storing based at least in part on determining the first parameter; and
provide the first parameter to the host device after storage of the first parameter.

12. The memory system of claim 11, wherein the control circuit is further configured to:
determine a quantity of memory cells in the first set of memory cells available to store data written to the memory system; and
store, in a second register, a second parameter associated with the quantity of memory cells based at least in part on determining the quantity of memory cells.

13. The memory system of claim 11, wherein the control circuit is further configured to:
receive a read command associated with the first register after storing the first parameter; and
output the first parameter from the first register based at least in part on receiving the read command.

14. The memory system of claim 11, wherein the control circuit is further configured to:
determine a third parameter associated with a third transition from a third performance level to the second performance level; and
store the third parameter in a third register based at least in part on determining the third parameter.

15. The memory system of claim 14, wherein, to determine the third parameter, the control circuit is further configured to:
determine a quantity of memory cells in the second set of memory cells available to store data written to the memory system, wherein the third parameter indicates the quantity of memory cells.

16. The memory system of claim 14, wherein, to determine the third parameter, the control circuit is further configured to:
determine a duration until the third transition from the third performance level to the second performance level, wherein the third parameter indicates the duration until the third transition.

17. The memory system of claim 14, wherein the control circuit is further configured to:
receive a read command associated with the third register after storing the third parameter; and
output the third parameter from the third register.

18. The memory system of claim 11, wherein the control circuit is further configured to:

receive a command to initiate a memory organization operation associated with the first set of memory cells and the second set of memory cells;

initiate the memory organization operation based at least in part on receiving the command; and update the first parameter stored in the first register based at least in part on initiating the memory organization operation.

19. The memory system of claim 18, wherein the control circuit is further configured to:

transfer a set of data from the first set of memory cells to the second set of memory cells based at least in part on initiating the memory organization operation.

20. The memory system of claim 18, wherein the control circuit is further configured to:

receive an access command associated with the first set of memory cells;

terminate the memory organization operation based at least in part on receiving the access command; and update the first parameter stored in the first register based at least in part on terminating the memory organization operation.

21. The memory system of claim 11, wherein:

the first performance level is associated with a first duration to perform the access on the first set of memory cells; and the second performance level is associated with a second duration to perform the access on the second set of memory cells, the second duration exceeding the first duration.

22. The memory system of claim 11, wherein the first set of memory cells are associated with a cache memory array of the memory system.

* * * * *